(12) United States Patent
Tokkonen

(10) Patent No.: US 7,292,230 B2
(45) Date of Patent: Nov. 6, 2007

(54) METHOD OF DEACTIVATING DEVICE LOCK STATE, AND ELECTRONIC DEVICE

(75) Inventor: Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 451 days.

(21) Appl. No.: 10/665,869

(22) Filed: Sep. 19, 2003

(65) Prior Publication Data
US 2004/0085351 A1  May 6, 2004

(30) Foreign Application Priority Data
Sep. 20, 2002 (FI) ................................. 20021682

(51) Int. Cl.
G06F 3/041 (2006.01)

(52) U.S. Cl. .................... 345/173; 380/205; 726/18

(58) Field of Classification Search ........ 345/173–181; 340/5.54, 5.74; 715/741; 713/184; 726/17, 726/18; 380/205
See application file for complete search history.

(56) References Cited

U.S. PATENT DOCUMENTS 5,559,961 A  9/1996  Blonder
6,720,860 B1 *  4/2004  Narayanaswami ......... 340/5.54
6,862,687 B1 *  3/2005  Suzuki .......................... 726/18
2002/0029341 A1  3/2002  Juels et al.
2005/0253817 A1 *  11/2005  Rytivaara et al. ........... 345/173

FOREIGN PATENT DOCUMENTS

| JP | 11203045 | 7/1999 |
| JP | 2002-082734 | 3/2002 |
| WO | WO 99/21073 | 4/1999 |
| WO | WO 01/77792 A2 | 10/2001 |

* cited by examiner

Primary Examiner—Kevin M. Nguyen
(74) Attorney, Agent, or Firm—Hollingsworth & Funk, LLC

(57) ABSTRACT

An electronic device comprises a touch screen and is configured to enter a lock state upon the fulfilment of a predetermined condition. The device is configured to display one or more images on the touch screen when the device is in the lock state, of which images one or more includes at least one predetermined point. The device is further configured to detect a touch on a predetermined point in one or more images and to deactivate the device lock state upon detection of a predetermined number of touches on successive images including a predetermined point.

20 Claims, 2 Drawing Sheets

METHOD OF DEACTIVATING DEVICE LOCK STATE, AND ELECTRONIC DEVICE

FIELD

Figure 1:
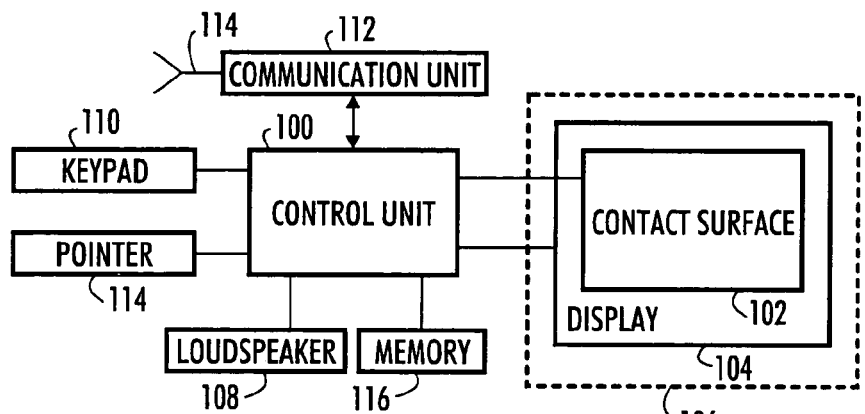

The invention relates to an electronic device comprising a touch screen and configured to enter a lock state upon the fulfilment of a predetermined condition. The invention relates particularly to deactivating a lock state.

BACKGROUND

In several electronic devices, touch screens are used to replace the mouse and the keypad, for example. The user issues commands to the device by touching objects visible on the touch screen. The ability to lock the device or its user interface to prevent unintentional functions, for example, is also known in several devices comprising some sort of a screen. In this case, the keypad does not receive the usual keystrokes, and in devices having a touch screen, the display does not respond to the usual touches. A lock state is thus used to prevent the operation of the device when the touch screen or keypad is subjected to unintentional keystrokes for instance during transport or caused unintentionally by the user. A lock state is also used to prevent unauthorized use of the device. A lock state can be activated for instance by depressing a given key(s) on the keypad or by selecting said function from menus on the touch screen. To deactivate the lock state, the user typically has to enter the right password or key combination.

It is also usual for the touch screen to automatically enter a so-called screensaver state when the device is not used for a given time. When in the screensaver state, the touch screen may display so-called screen saver information, such as news reviews via an Internet connection. The screensaver state ends when the user touches the display or the keypad or moves the mouse, for example. However, to prevent unauthorized use of the device, for example, a special screensaver password may be taken into use, and the user has to enter it for instance via the keypad to deactivate the screensaver state.

The drawback in prior art solutions is the difficulty in remembering special passwords to deactivate a lock state or the corresponding screensaver state. In addition, the use of passwords is especially hard for certain user groups, such as the elderly and handicapped. Furthermore, when for instance a person, who is authorized to use the device but is not the person who specified the password, wants to use the device, he has to know the password. If, again, no screensaver password is required to deactivate the screensaver state, the device may be subjected to unauthorized use or be activated unintentionally during transport, for example. Further, a separate input device, such as a keypad or a writing pad, is required for inputting passwords, which may complicate the use of a device having a touch screen.

BRIEF DESCRIPTION

The object of the invention is to provide an improved method of deactivating a lock state, and a corresponding device. An embodiment of the invention is a method of deactivating a lock state in an electronic device comprising a touch screen, one or more images being displayed on the touch screen when the device is in the lock state, of which images one or more includes at least one predetermined point; detecting a touch on a predetermined point in one or more images; deactivating the device lock state upon detection of a predetermined number of touches on successive images including a predetermined point.

Another embodiment of the invention is an electronic device comprising a touch screen, the device being configured to enter a lock state upon the fulfilment of a predetermined condition. The device includes means for displaying one or more images on the touch screen when the device is in the lock state, of which images one or more includes at least one predetermined point; means for detecting a touch on a predetermined point in one or more images; and means for deactivating the device lock state upon detection of a predetermined number of touches on successive images including a predetermined point.

The method and device of the invention provide a plurality of advantages. The solution simplifies the deactivation of the lock state in a device. A touch screen lock can be deactivated rapidly without a keypad. The method is easy to use and learn.

In a preferred embodiment, an image database is maintained in the device and the images are selected from it. The images include a given point, preferably selected by the user, which, when touched, performs a step in the deactivation of the lock state. When the device has detected touches on given points in images displayed in succession, the device deactivates the lock state and the device can again be used normally. The images are preferably selected by the user. Since both the images and the given point therein that has to be touched are selected by the user, the deactivation of the lock state is clearer than entering a password due to the visual property of the method, and thus easier for the user. However, secrecy remains on a high level, since the device lock state cannot be deactivated by touching the images at random.

In a preferred embodiment, the secrecy can be further improved in such a manner that the given point in the images changes adaptively depending on a parameter, such as the date.

A preferred embodiment uses a pointer means, such as a mouse, instead of or in addition to touches on the touch screen to deactivate the lock state.

LIST OF FIGURES

Figure 2A:
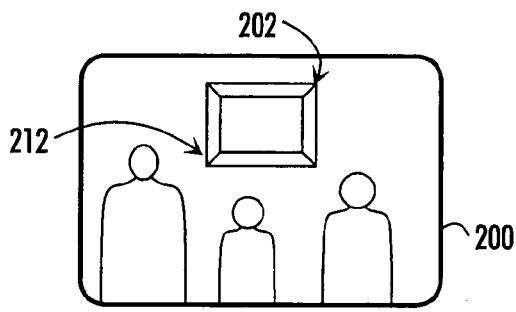
Figure 2B:
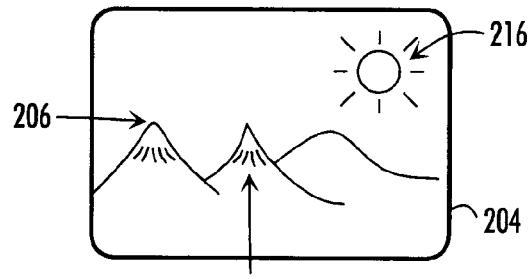
Figure 2C:
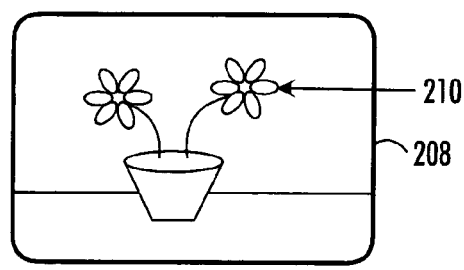
Figure 3A:
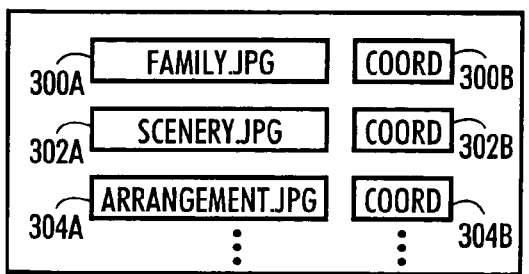
Figure 3B:
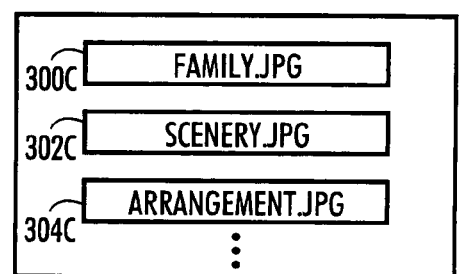
Figure 4:
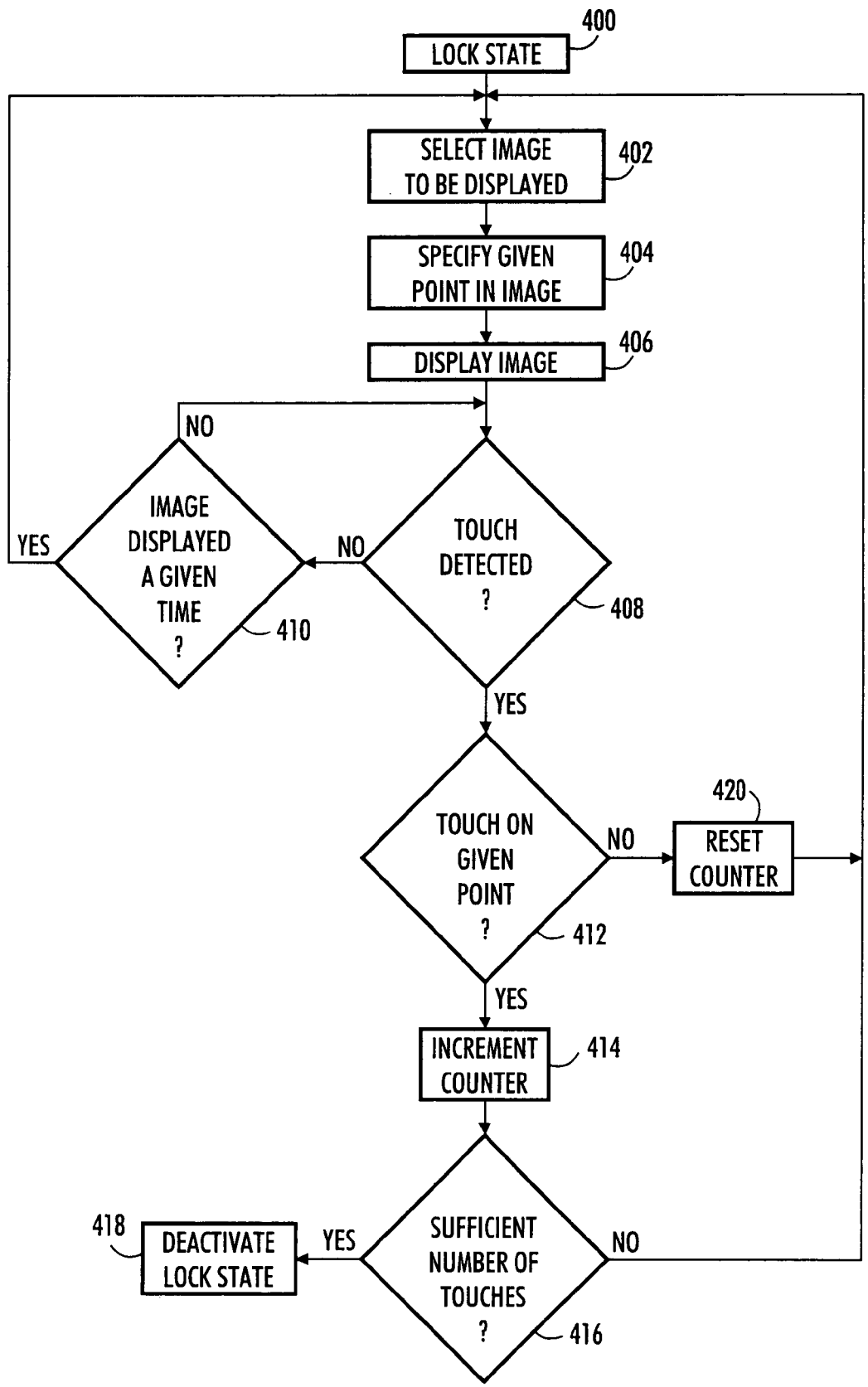

In the following, the invention will be described in detail in connection with preferred embodiments with reference to the accompanying drawings, in which FIG. 1 illustrates an example of a device in which the preferred embodiments can be applied, FIGS. 2A to 2C illustrate examples of images and given points, FIGS. 3A and 3B show an example of storing images in a memory, and FIG. 4 is a flow diagram illustrating an embodiment.

DESCRIPTION OF THE EMBODIMENTS

Preferred embodiments of the invention are applicable in electronic devices, such as a mobile station, used as a terminal in telecommunication systems including base stations and terminals communicating with the base stations. In some embodiments of the invention, the device includes means for short-range communication, implemented by means of a Bluetooth chip, an infrared or WLAN connection, for example. The electronic device is for instance a mobile telephone or another device including telecommunication means, such as a portable computer, a handheld computer or a smart telephone. The electronic device may also be a PDA (Personal Digital Assistant) device including telecommunication means for establishing a network connection, or a PDA device that can be coupled to a mobile telephone, for instance, for a network connection. Other alternatives include computers or PDA devices not including telecommunication means.

FIG. 1A shows a block diagram of the structure of a portable electronic device. The basic functions of the device are controlled by a control unit 100, typically implemented by means of a microprocessor and software or separate components. The user interface of the device comprises a display 104 and a contact surface 102, which together form a touch screen 106. The touch screen 106 is accomplished by placing the contact surface 102 on top of the display 104. An alternative way to implement the touch screen 106 is not to actually place anything on top of the display 104, but to indicate the contact point by other means. The display 104 is typically a liquid crystal display. In the figure, the contact surface does not cover the entire area of the display. This can also be implemented in many ways. The display may be entirely covered by a contact surface or, alternatively, the display may comprise one or more contact surface areas covering the area of the display either partly or entirely.

A way to implement the contact surface 102 is based on two overlapping transparent films and continuous electric current, which is generated between the films when the outer film is pressed with a finger or another object against the lower film, which is covered with a resistive layer. The contact surface 102 may also be implemented capacitively, whereby the surface is covered with an electrically conducting layer, over which an alternating current acts. The capacitance of the human body couples part of the voltage at the contact point to ground, allowing the voltage to be measured. The contact surface 102 can also be implemented acoustically based on ultrasonic waves traversing the surface of the display. When the display is touched, the sonic wave traversing the surface is attenuated, and the change can be measured. The contact surface 102 may also be implemented with infrared light, and as well with said ultrasound, but using infrared light instead of sonic waves. It is also feasible to implement the contact surface 102 by means of power sensors or a projector and cameras. In principle, the contact surface 102 may be any surface on which an image is reflected with a projector and a camera is used to detect the point where the projected image was touched.

The user interface of the device may also comprise a loudspeaker 108 and a keypad 110 and a pointer means 114, such as a mouse, a track stick or a touch-pad. Depending on the type of the device, there may be different and a different number of user interface parts. The device in FIG. 1, such as a mobile station, may also comprise conventional means 112 implementing the functions of a mobile station and including speech and channel coders, modulators and RF parts. The device may also comprise an antenna 114. The device also typically comprises a memory 116 for storing e.g. telephone numbers, calendar data and other user-specific data.

The lock state of the device may be activated by carrying out measures leading to the locking using the keypad 110 or the touch screen 106. The device may also automatically enter the lock state when not used during a given time. During the lock state, the control unit 100 does not react to commands given via the keypad or the contact area before the lock is deactivated. Known exceptions to this do exist, for instance incoming calls can be answered as usual during the lock state. During the lock state, the touch screen does not react to touches on the display except to touches enabling the deactivation of the lock state, to be presented later.

In an embodiment of the invention, when the device is in the lock state, the control unit 100 shows one or more images including at least one predetermined point on the touch screen of the device. The images may be stored in advance for instance in the memory 116 of the device. The control unit 100 selects the images from the image database randomly, for example. The selection may also be predetermined or follow a given algorithm.

The images to be displayed may be images selected by the user of the device. In each image, the user has selected a given point, a touch on which is used as means to deactivate the lock state. Let us study FIGS. 2A to 2C. The figures show simplified examples of usable images. Let us assume that a given point is selected in the images. In image 200 in FIG. 2A, the given point selected is the upper right corner 202 of a picture on the wall. In image 204 in FIG. 2B, the given point selected is the top 202 of the leftmost mountain. In image 208 in FIG. 2C, the given point selected is a petal 204 in the rightmost flower.

In an embodiment, images 200, 204, 208 are stored in an image database in the memory 116 of the device. With reference to FIG. 3A, the images can be stored for instance as records including image 300A, 302A, 304A, and corresponding information 300B, 302B, 304B on each image about the location of the given point in the image. Thus, for example image 200 is stored in location 300A and information about the given point of image 200 in location 300B. Consequently, when image 200 is read from the memory 116 at location 300A for display on the touch screen, information about the given point in image 200 is simultaneously read at location 300B. Similarly, when image 204 is read from the memory 116 at location 300A for display on the touch screen, information about the given point of image 200 is simultaneously read at location 300B. Information about the given point in the image may also be stored for example as coordinates calculated from a given origin point. The size of the given point may also vary, and the information may include its size, for example as coordinate points. The location of the given point may also be indicated in other manners known to those skilled in the art.

In an embodiment, images may be stored for instance as records in accordance with FIG. 3B, comprising both the image and information about the location of the given point in the image in one file 300C, 302C, 304C. This means that information about the location of a given point in the image is coded in the image file. Such coding of extra information is best implemented by means of steganography. Steganographical applications are often based on replacing the noise in the image with the desired information to be included in the image. Steganographical methods are known to those killed in the art and are not studied in detail herein. An advantage of this embodiment is that although an outsider gained access to the information stored in the memory 116, the information included in the image is not easily found out.

In an embodiment, the image displayed on the touch screen includes more than one predetermined point. Let us study FIGS. 2A to 2B. Image 200 includes two predetermined points, in this example the different corners 202, 212 of a picture on the wall. Image 204 includes three predetermined points: the top 202 of the leftmost mountain, the snowline 214 of the middle mountain, and the sun 216. In this embodiment, one of the different points included in the image is selected as the point to be touched when the image is displayed. The selection may be based on a predetermined parameter. Such parameters include information relating to the calendar, such as the day of the week or the date, for example. Thus, a different point in the image may be selected for use on different days of the week. Similarly, a different point can be selected for odd and even days. In an embodiment, the user ID registered as the user before the device enters the lock state may affect the choice of the given point. This means that the same image may be shown to different users, but the point to be touched is different for different users.

Let us study an embodiment by means of the flow chart in FIG. 4. In step 400, the device is in a lock state. During device lock state, the control unit 100 in the device does not react to commands given via the keypad or a contact area before the lock is deactivated, excluding the touches on given points in the image for deactivating the lock state.

In step 402, the control unit selects the image to be displayed on the touch screen during the lock state. The image can be read from the image database in the memory 116 of the device. The image can be selected either randomly or the images in the database may also be displayed in a given order or based on a predetermined selection algorithm. Such algorithms include selection of images according to the name in alphabetical order, according to the date, or according to other given search words. The algorithms presented are only some alternatives as is evident to a person skilled in the art.

In step 404, the control unit 100 determines the predetermined point in the selected image. This is carried out in the above manners. Information about the point can be either read from the image database from the image or decoded from the image file. If the image includes several given points, the control unit selects the point in current use in the above-described manners.

In step 406, the image selected is displayed on the touch screen.

In step 408, the control unit 100 checks if the touch screen 106 gives an indication of a touch on the display. If not, in step 410 a check is made to see if the current image has been displayed a sufficiently long time. As is the case with screensavers, each image is displayed a predetermined time, after which a new image is selected in step 402. If not, step 406 is reentered. In another feasible implementation, each image is displayed as long as the image is touched. In this case, step 410 is not executed, but detection continues in step 408 as long as a touch is detected.

If a touch on the touch screen is detected in step 408, the control unit 100 checks in step 412 whether a touch on the given point in the image on the display is involved. When the touch screen informs the control unit of the touch, the control unit simultaneously receives information as to the point on the display that was touched. This is known in association with touch screens. The control unit now compares the coordinates of the touch informed by the touch screen with the coordinates of the given point in said image. If they match with a predetermined accuracy, then the control unit concludes that the given point was touched. How near the determined point the touch has to hit in order to be accepted as the right touch can be programmed in the control unit. This, too, is known in association with touch screens.

If the conclusion in step 412 is that the touch detected by the touch screen hit the given point, step 414 is entered. A condition can be set on the deactivation of the lock state stating that a sufficient preset number of touches on successive images displayed is required. This number can be predetermined as desired. The more touches are required on a predetermined point in successive images displayed on a touch screen, the safer is the lock state. On the other hand, in this case the deactivation of the lock state also takes longer. The number may be compared with the length of a password. The control unit 100 may for instance maintain a counter wherein the number of successive correct touches is registered. In step 414, the counter is incremented by one.

In step 416, the control unit 100 checks if the number of successive touches is sufficient, i.e. for instance compares the counter value it maintains with a preset threshold value. If the number of touches is sufficient, the counter is reset and the device lock state is deactivated in step 418. If the number of touches is not yet sufficient, step 402 is entered to select a new image to be displayed on the touch screen.

If the conclusion in step 412 is that the touch did not hit the given point in the image displayed on the touch screen, step 420 is entered, where the counter for successive correct touches, maintained by the control unit, is reset, and step 402 is entered to select a new image to be displayed on the touch screen.

If desired, a counter for successive erroneous touches can also be maintained in step 420 and check if there is a given number of successive erroneous touches, and, if desired, the lock state may be left and a still more secure state entered, where the device is unlocked in some other manner, such as using a password or by only a given touch combination, for example.

In another embodiment, a touch on the predetermined points in the images on the display can be detected by means of not only the touch screen but also the pointer means of the device. If the pointer means is a mouse, for example, the cursor can be moved to a given point on the display by moving the mouse and depress the mouse button. The control unit of the device interprets this depression as a touch on a predetermined point. In other respects, the operation of the embodiment is similar to that described in FIG. 4.

Although the invention is described above with reference to the example according to the accompanying drawings, it is apparent that the invention is not limited thereto, but can be modified in a variety of ways within the scope of the attached claims.

The invention claimed is:

1. A method of deactivating a lock state in an electronic device comprising a touch screen, comprising
displaying one or more images on the touch screen when the device is in the lock state, of which images one or more includes more than one predetermined point;
selecting only one of the predetermined points, where an image includes more than one predetermined point, as a point to be touched by means of a predetermined parameter each time the image is displayed;
detecting a touch on a predetermined point in one or more images;
deactivating the device lock state upon detection of a predetermined number of touches on successive images including the selected predetermined point.

2. A method as claimed in claim 1, further comprising: selecting the images to be displayed from an image database.

3. A method as claimed in claim 2, further comprising: selecting the images to be displayed randomly.

4. A method as claimed in claim 2, further comprising: maintaining, in the device, a database including information about the predetermined points in the images in the image database.

5. A method as claimed in claim 1, wherein information about the predetermined point is coded in the image in advance.

6. A method as claimed in claim 1, further comprising: maintaining, in the device, an image database from which the images are selected.

7. A method as claimed in claim 1, wherein the predetermined parameter is a date or a day of the week.

8. A method as claimed in claim 1, wherein the predetermined parameter is a user ID registered as the user in the device before the transfer to the lock state.

9. A method as claimed in claim 1, further comprising:
reading the image from the image database,
reading information about the predetermined point in the image,
displaying the image on the display until a touch on the touch screen is detected or until a predetermined period of time has elapsed, checking if a predetermined number of touches on successive images including a predetermined point is detected, whereby the device lock is deactivated; otherwise, a new image is read from the database.

10. A method as claimed in claim 1, further comprising: detecting a touch on a predetermined point by means of the touch screen.

11. A method as claimed in claim 1, further comprising: detecting a touch on a predetermined point by means of a pointer means in the device.

12. An electronic device configured to enter a lock state upon the fulfillment of a predetermined condition, the device comprising
a touch screen;
means for displaying one or more images on the touch screen when the device is in the lock state, of which images one or more includes more than one predetermined point; means for selecting only one of the predetermined points, where an image includes more than one predetermined point, as a point to be touched by means of a predetermined parameter each time the image is displayed;
detection means for detecting a touch on a predetermined point in one or more images; and
means for deactivating the device lock state upon detection of a predetermined number of touches on successive images including the selected predetermined point.

13. A device as claimed in claim 12, wherein the device includes means for maintaining an image database, and selecting means for selecting the image to be displayed at each particular time from the image database.

14. A device as claimed in claim 13, wherein the selecting means are configured to select the image to be displayed at each particular time from the image database randomly.

15. A device as claimed in claim 13, wherein the image database includes images, in which information about the predetermined point is coded in advance.

16. A device as claimed in claim 14, wherein the device includes means for maintaining a database including information about the predetermined points in the images in the image database.

17. A device as claimed in claim 12, wherein the touch screen is configured to transfer information about a touch on a predetermined point to the detection means.

18. A device as claimed in claim 12, wherein the device comprises pointer means configured to transfer information about a touch on a predetermined point to the detection means.

19. A device as claimed in claim 18, wherein the pointer means is realized with a mouse, a track stick or a touch-pad.

20. An electronic device configured to enter a lock state upon the fulfillment of a predetermined condition, comprising
a touch screen and a controller configured to display one or more images on the touch screen when the device is in the lock state, of which images one or more includes more than one predetermined point; wherein
the controller is further configured to select only one of the predetermined points, where an image includes more than one predetermined point, as a point to be touched by means of a predetermined parameter each time the image is displayed; detect a touch on a predetermined point in one or more images; and to deactivate the device lock state upon detection of a predetermined number of touches on successive images including the selected predetermined point.

* * * * *